US008566888B2

(12) United States Patent
Gong et al.

(10) Patent No.: US 8,566,888 B2
(45) Date of Patent: Oct. 22, 2013

(54) SYSTEM FOR UPDATING CHANNEL LINEUP FOR BROADCASTING AND SWITCHED DIGITAL BROADCASTING SERVICES

(75) Inventors: Jiong Gong, Lafayette, CO (US); David P. Reed, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1512 days.

(21) Appl. No.: 11/963,378

(22) Filed: Dec. 21, 2007

(65) Prior Publication Data
US 2009/0165064 A1 Jun. 25, 2009

(51) Int. Cl.
*H04N 7/173* (2011.01)

(52) U.S. Cl.
USPC .............................................. 725/94; 725/95

(58) Field of Classification Search
USPC ...................................................... 725/94, 95
See application file for complete search history.

(56) References Cited

U.S. PATENT DOCUMENTS

| | | | |
|---|---|---|---|
| 7,656,908 B1* | 2/2010 | Begeja | 370/507 |
| 2004/0226044 A1* | 11/2004 | Goode | 725/95 |
| 2007/0094691 A1* | 4/2007 | Gazdzinski | 725/62 |
| 2007/0107026 A1* | 5/2007 | Sherer et al. | 725/97 |
| 2009/0077577 A1* | 3/2009 | Allegrezza et al. | 725/14 |
| 2009/0150943 A1* | 6/2009 | Vasudevan et al. | 725/86 |

OTHER PUBLICATIONS

"The Statistics of Switched Broadcast," by Nishith Sinha, from BigBand Networks at www.bigbandnet.com.
"Evolving Switched Broadcast Beyond First Generation Developments," by Jim Nguyen and Ran Oz of Bigband Networks at www.bigbandnet.com.

* cited by examiner

*Primary Examiner* — Nasser Goodarzi
*Assistant Examiner* — Hyun Hong
(74) *Attorney, Agent, or Firm* — Davis Wright Tremaine LLP

(57) ABSTRACT

In a system that is capable of operating in a broadcast mode and a switched mode, it is advantageous to be able to shift program delivery between the two modes. Thus when one video program is being delivered to at least a first customer in a first mode, this program may be delivered to at least a second customer in a second mode that is different from the first mode. In this manner, the video program that is being delivered to first customer will be maintained in the original mode while new requests for this program will be served in a different mode until the delivery of the program to the first customer has been completed. In other words, legacy program delivery is maintained until the program delivery has been completed or otherwise terminated, while delivery of the program in response to new requests for the same program will be delivered in a different mode instead.

24 Claims, 4 Drawing Sheets

SYSTEM FOR UPDATING CHANNEL LINEUP FOR BROADCASTING AND SWITCHED DIGITAL BROADCASTING SERVICES

BACKGROUND OF INVENTION

This invention relates in general to systems for transmitting video signals, and in particular, a system for updating channel lineup for broadcasting and switched digital broadcasting services.

Television program are delivered through coaxial cables to subscribers, where the capacity is limited by the bandwidth of the coaxial cables. With the introduction of high definition television programs, and increased number of channels that are offered to cable subscribers, there is a need for increasing the efficiency in bandwidth use of coaxial cables in digital video transmission. This is especially the case since a large portion of the capacity is devoted to analog transmission through the cables.

One solution for a more efficient use of the capacity available in coaxial cables is known as the switched broadcasting architecture. Television programs are traditionally broadcast to all subscribers whether or not the subscribers are watching the programs. A large percentage of television programs delivered in this manner are actually not watched by subscribers. In a switched broadcasting architecture, television programs are delivered only to subscribers who request such programs. While the specific frequency and program for a switched broadcast program may vary in time, the channel number as seen by the subscriber will always remain the same. In this manner, the subscriber will not notice any difference between the two different approaches. For more detailed explanation of the switched broadcasting architecture, please see the article "The Statistics of Switched Broadcast," by Nishith Sinha, from BigBand Networks at www.bigbandnet.com.

Switched broadcasting may be operated in two different modes. In the first switched mode known as the switched multicast, more than one subscriber within the network node, or service group, may access the same program stream. This provides additional bandwidth savings. Thus if a subscriber wants to watch a program that is currently being delivered to other subscribers within the same node or service group, the new viewer simply joins the existing switched session. Consequently, no additional capacity is consumed by the incremental subscriber.

Alternatively, in a mode known as switched unicast, each subscriber may receive a unique program stream. For further details concerning the two types of switched broadcast modes, please see "Evolving Switched Broadcast Beyond First Generation Developments," by Jim Nguyen and Ran Oz of Bigband Networks at www.bigbandnet.com.

With the adoption of the switched broadcast modes, it is desirable to provide a technique for utilizing the traditional broadcasting tier and the switched broadcasting tier in a manner that allows bandwidth utilization efficiency to be improved.

Considerations similar to those above may be applicable to other systems for delivering video programs, such as to cellular telephone systems. It is therefore desirable to provide an improved technique for bandwidth utilization in systems such as cellular telephone systems.

SUMMARY OF THE INVENTION

In a system that is capable of operating in both the broadcast mode and a switched mode, video programs are delivered to customers in at least one of the two modes. For at least one of the plurality of radio programs that is being delivered to at least the first customer in a first mode of the two modes, such at least one video program is delivered to at least a second customer in a second mode of the two modes that is different from the first mode. Preferably, the above process is carried out by a service manager.

In a system that is capable of operating in both the broadcast mode and a switched mode, a video program is being delivered to at least one customer in a first mode of the two modes. According to one embodiment of another aspect of the invention, delivery of the video program to the at least one customer in the first mode is maintained until delivery of the video program is completed or is terminated by the at least one customer. Requests for the video program is monitored, and when system capacity is available, the video program is delivered in a second mode of the two modes different from the first mode, whether or not delivery of the video program in the first mode is maintained. Preferably, the above process is carried out by a service manager.

DETAILED DESCRIPTION OF EXEMPLARY EMBODIMENTS

Figure 1:
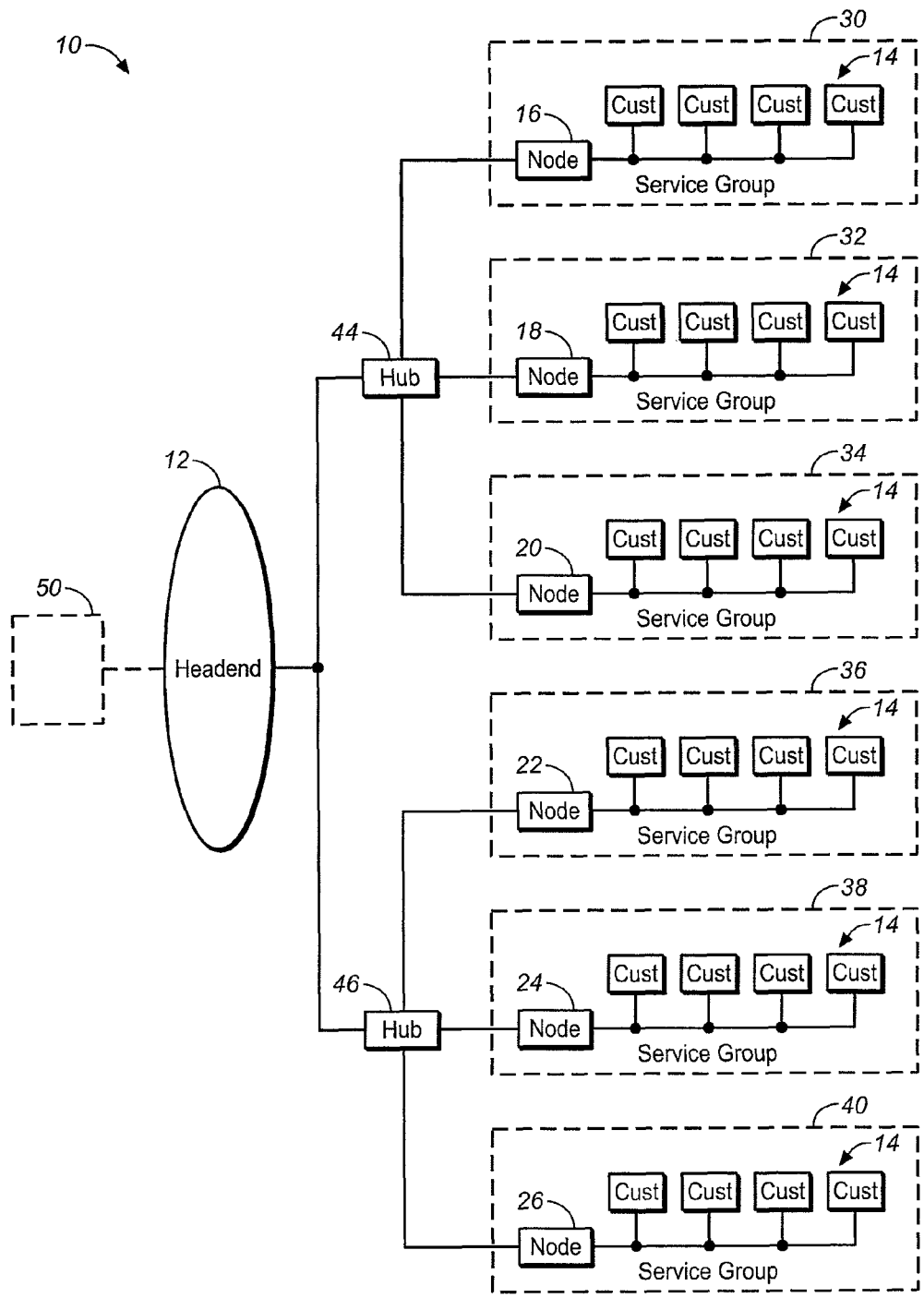
FIG. 1 is a block diagram of video program delivery system employing coaxial cables for delivery to subscribers useful for illustrating the invention.

FIG. 1 is a block diagram of a cable television system useful for illustrating the invention. As shown in FIG. 1, system 10 includes a headend 12 in communication with a number of hubs. While two hubs 44 and 46 are illustrated in FIG. 1, it will be understood that the number of hubs in communication with headend 12 may be fewer than or more than two as illustrated in FIG. 1. Each of the hubs is in communication with a plurality of nodes. As shown in FIG. 1, for example, hub 44 is in communication with nodes 16, 18 and 20. Hub 46 is in communication with nodes 22, 24 and 26. Each of the nodes 16, 18, 20, 22, 24, 26 serves a number of customers within a service group. For example, node 16 serves the customers or subscribers in service group 30 and nodes 18, 20, 22, 24, 26 serve respectively the service groups 32, 34, 36, 38 and 40. Each of the customers or subscribers has a set top box 14 connected to one of the nodes. For example, the set top boxes 14 of the customers or subscribers in service group 30 are connected to node 16. Television programs received from the headend 12 are delivered to the nodes by the hubs 44 and 46, and the programs are delivered by the nodes to their respective service groups.

In the broadcasting mode, television programs are delivered to the nodes through the hubs irrespective of whether these programs are requested by the customers or subscribers at all. In the switched modes, however, only those programs that are requested are delivered. For example, if one of the customers or subscribers in service group 30 requests a particular program A, this request is transmitted from node 16 to hub 44 which responds by delivering program A only to node 16, so that all subscribers or customers within service group 30 will have access to such program. In the switched multicast mode, all of the customers or subscribers within service group 30 will access the program through the same program stream. The manner in which the broadcasting and the switched modes are implementing by means of circuits and protocol are known to those skilled in the art so that there is no need to describe them herein.

In some implementations, the headend 12 carries out functions similar to that of hub 44 or hub 46 with respect to one or more service groups, which service groups and their respective nodes are indicated collectively by the dotted line box 50 connected to headend 12 shown in FIG. 1

One aspect of the invention is based on the observation that when a program is being transmitted to subscribers or customers through the broadcasting mode or the switched broadcasting mode, it may be desirable for the program to be switched to different mode instead for the most efficient use of bandwidth of the coaxial cable. For example, if a program is particularly popular so that many subscribers or customers request the program, it may be a more efficient use of bandwidth to broadcast the program to all subscribers within selected service groups or even to all service groups. On the other hand, if a program is requested only by a few subscribers or customers within the service groups, then it may be advantageous to transmit the program in the switched mode at least for service groups where only a few of the subscribers or customers request the program.

If a particular program is being transmitted first in the switched mode because only a few customers or subscribers within a particular service group initially request the program and in time more and more customers or subscribers request the same program, it may be advantageous to shift the transmission of the program from a switched mode to a broadcast mode. In other words, it may be desirable to update the channel lineup for broadcasting in switched digital broadcasting services dynamically depending upon subscriber interest in the various programs that are being delivered.

On the other hand, a particular program may be transmitted initially in the broadcasting mode and in time fewer and fewer customers or subscribers are tuned in to the program, so that it may be advantageous to shift the transmission of the program from a broadcasting mode to a switched mode.

One embodiment of the invention is based on the recognition that under these circumstances, shifting transmission modes as described above will improve efficiency of bandwidth utilization.

Dynamic updating of switched channels allows the system to automatically peg with the least popular program channels to maximize switching efficiency. Dynamic updating is preferably non-intrusive and transparent to end viewers so that viewers do not have to see an abrupt disruption of flipping to another frequency band for the same channel. This essentially means a transition period is provided when the program channel at issue needs to be simulcast at the same time, both in broadcasting mode and in switched broadcasting mode.

First consider the easier case of shifting a switched channel to the broadcast tier. This is fairly straightforward. Once a program channel starts to be broadcast after the service manager makes the decision based on the popularity score calculated, for example, all existing switched capacity for the same channel is not immediately torn down. The service manager can merely decide that all new requests for the same program channel will now be addressed by the broadcast tier. Just wait for the existing streams in the switched tier to gradually die out.

Figure 2:
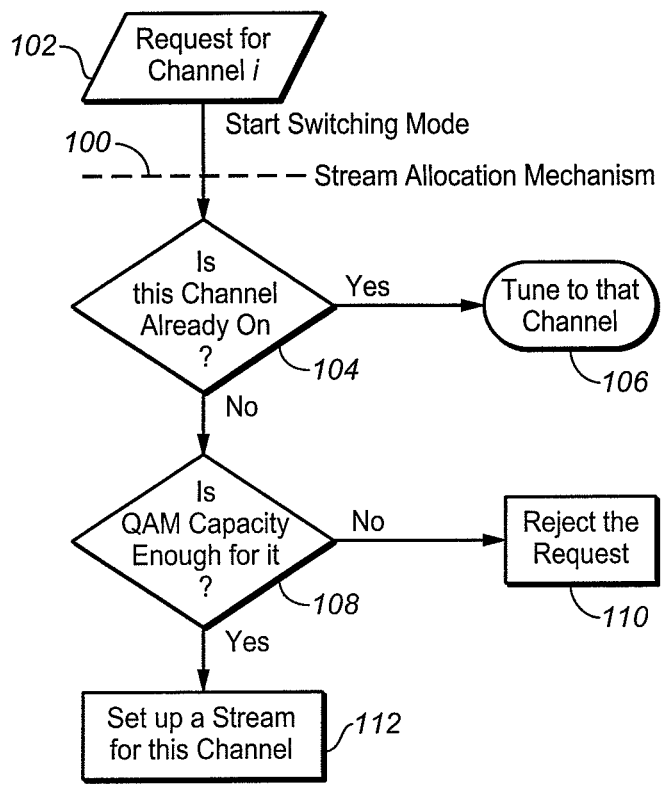
FIG. 2 is a flowchart illustrating a process of a stream allocation mechanism responding to a request for a channel to illustrate one embodiment of the invention.
Figure 3:
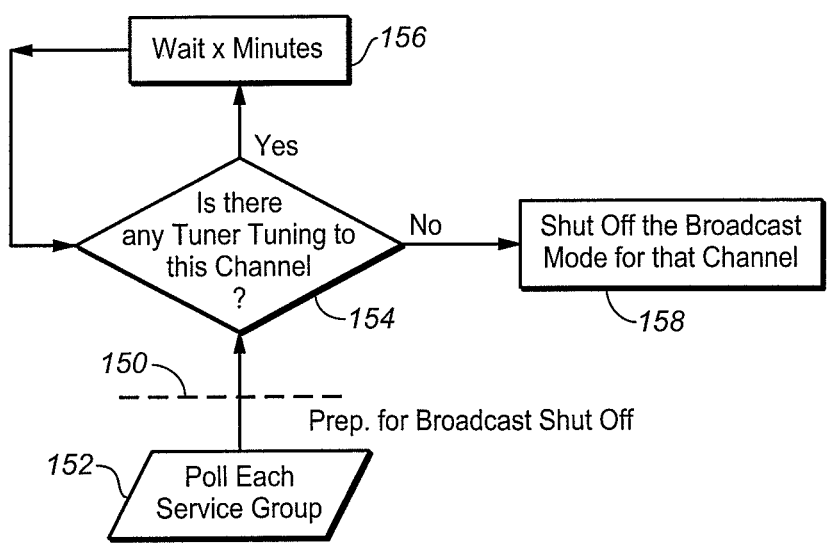
FIG. 3 is a flowchart illustrating the process for polling a service group to illustrate another embodiment of the invention.

The opposite case of moving a broadcast program channel to the switched tier can be a bit more complicated. Again a simulcast transitional period is called for. Once a program channel is available in the switched tier, all new requests for the same channel will from now on be addressed by the switched tier. When to shut down the broadcast tier will preferably wait until all tuners tuning to that broadcast channel die out before shutting it down. The service manager may poll regularly each service group to make sure there are no active set top boxes tuning to the broadcast channel. Once all existing tuners have died out in every service group, the program can be finally shut down from the broadcast tier. FIGS. 2 and 3 illustrate this process via flow charts.

Another issue relevant to the transition method is to determine which sequence takes place first, shifting switched channels to the broadcast tier first, or shifting broadcast channels to the switched tier first. Since the bandwidth capacity for the broadcast tier is fixed on a one-to-one basis while the bandwidth consumption for the switched tier is statistical in nature with an over-booking ratio, it makes sense to first vacant the bandwidth capacity in the broadcast tier first by shifting the selected channels to the switched tier first. Once that transition is completed after all set top boxes tuning to those channels in broadcast mode have all died out, the second phase of shifting selected channels in the switched tier to the broadcast mode kicks in.

The proposed transition process requires no more extra capacity for the broadcast tier, and may require some extra capacity for the switched tier, but only during the transition period. But this can easily be addressed by making sure that the transition period takes place during an off-peak time, say in the middle of the night. The overall implication for extra capacity might be so small and during such a short period of time that it can be effectively ignored, as explained below.

FIGS. 2 and 3 are flowcharts illustrating the case of moving a broadcast program channel to the switched tier. The various actions or steps taken as illustrated in FIGS. 2 and 3 may be carried out by the hubs 44 and 46. However, if headend 12 also serves one or more service groups as indicated by box 50, these actions or steps may also be carried out by the headend 12.

The service manager may determine that it is desirable to shift transmission of a particular program from the broadcasting mode to a switched broadcasting mode as indicated by the dotted line 100 in FIG. 2. After the service manager at the hub or headend receives a request from a customer or subscriber for access to channel i (Parallelogram 102), the service manager will check to see whether this channel is already on (Diamond 104). If this channel is already on indicating that the program requested is already being delivered, the service manager will cause the set top box of the subscriber or customer making the request to be tuned to that channel. If the program is delivered in either the broadcast or multicast switched tier, the new viewer will be tuned to the same program stream that is being used for delivering the program (Oblong 106). If the channel is not on, the service manager at the hub or headend will then check to see whether QAM capacity is enough for starting a new program stream (Diamond 108). If there is not enough QAM capacity available in the cable for a new stream, this request is rejected (Block 110) and the subscriber or customer is notified. If, however, QAM capacity is adequate for accommodating a new program stream, then a new stream is being set up by the service manager for this channel (Block 112). This program stream is preferably in a multicast switched mode.

As noted above, once a program channel starts to be broadcast after the service manager at the hub or headend decides to switch the channel to a switched tier, the existing program streams that are being delivered are not immediately shut down. The service manager can decide that all new requests for the same program will now be addressed by the switched tier. In order to completely shut down the broadcast tier, the service manager will have to wait for the existing program streams in the broadcast tier to gradually die out. This means that during a time period, called a transition time period, the same program channel will be delivered both in the broadcast tier and the switched tier.

After the service manager decides to start a switched mode such as the switched multicast mode at 100 in FIG. 2, the existing program streams delivering programs in the broadcast tier to subscribers and customers are not immediately shut down, although new requests for the program channel are now delivered through the switched tier by means of the actions or steps in FIG. 2. Meanwhile, the service manager will poll the various nodes to determine whether any tuner in the set top boxes of the service groups are still tuned to this channel in the broadcast mode. The service manager will wait until no tuner in all of the various service groups are tuned to this particular channel before the broadcast mode is shut off. This is illustrated in FIG. 3.

Thus to prepare for broadcast mode shutoff, as indicated by the dotted line 150 in FIG. 3, the service manager in hub 44, 46 or headend 12 will poll (Parallelogram 152) each of the service groups, such as service groups 30, 32, 34, 36, 38, 40 and those in box 50, as to whether any tuner in the set top boxes of these service groups is tuned to this particular channel through the broadcast mode (Diamond 154). If at least one tuner is still tuned to this particular channel in the broadcast mode, then the service manager will wait for a time period indicated as "x" minutes in FIG. 3 and then again poll each set top box where the tuner in such box was tuned to this particular channel in the broadcast mode during the last polling to determine whether any tuner is tuned to the channel in the broadcast mode through a feedback loop (Block 156). This process is repeated every "x" minutes until no tuner is tuned to this particular channel in the broadcast mode so that the service manager will then proceed to shut off the broadcast mode (Block 158) for the delivery of such program. From this point on, this particular channel is delivered only in the switched mode and no longer in the broadcast mode.

Figure 5:
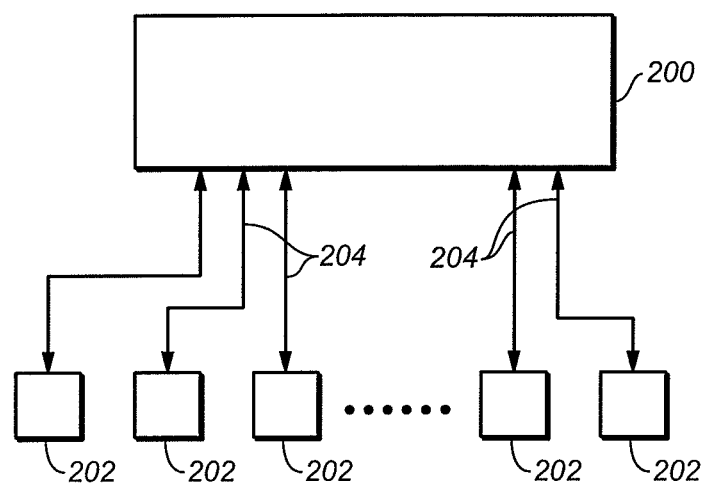
FIG. 5 illustrates one of the base stations in communication with a number of cellular phones.

In the case of a cellular phone system, these actions or steps described above in reference to FIGS. 2 and 3 may also be carried out by the service manager(s) at one or more base stations, each of which is in wireless communication with a number of cellular phone users through their phones. FIG. 5 illustrates one of the base stations 200 in communication with a number of cellular phones 202 through wireless communication 204.

Figure 4:
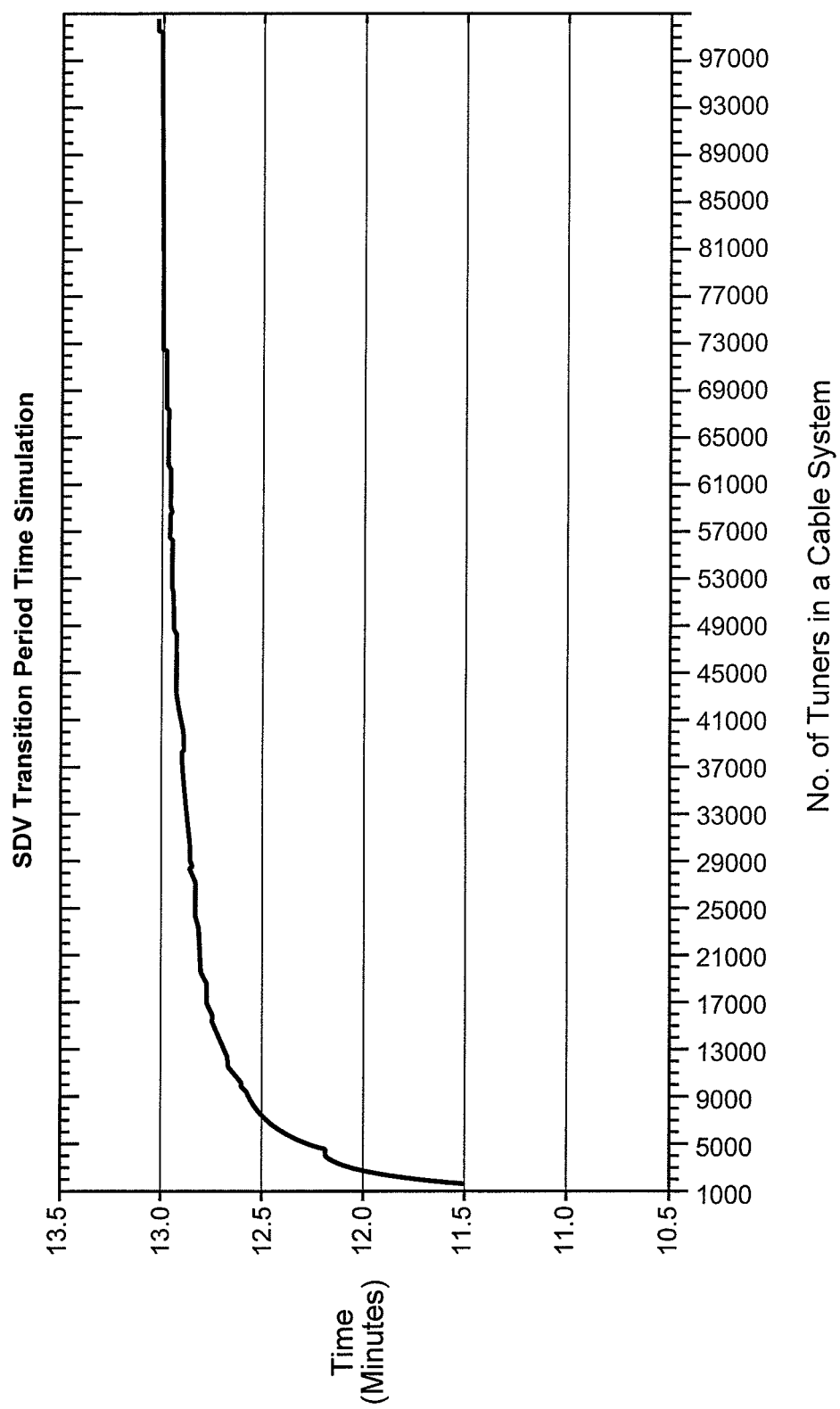
FIG. 4 is a graphical plot of a simulation that measures the time it takes for a hypothetical cable system to update the channel lineup.

FIG. 4 is a graphical plot of a simulation that measures the time it takes for a hypothetical cable system to update the channel lineup. As described above, the transitional update time is driven by how long it takes to vacate the spectrum occupied by this program channel in the broadcasting tier that needs to be moved to the switched tier. For that purpose, a simulation engine is used to estimate the switched digital video capacity requirement.

For a particular program channel, estimating the update time involves identifying the longest time a tuner takes to change from that particular channel. By means of a simulation engine, it is possible to document the length of all stream requests. It appears that taking the maximum length of all these streams should be an adequate measure. Actually this is assuming the worst case scenario, a case where transition time starts exactly when that "worst-behaving" tuner tunes into the program channel at issue, which is in itself an almost zero probability event. In reality, transition time starts somewhere in the middle of a stream length. As a result, a few transition starting times are randomly picked and the average of the remaining life spans of the longest stream tuning to that channel is taken. This exercise is done repeatedly for a number of system size scenarios from a 100 tuners to 100,000 tuners.

Assuming 77 program channels are switched, the average time a tuner tunes into a program channels is 12 minutes. The results are illustrated in the FIG. 4.

Aside from the observation that transition time does not take very long, several interesting conclusions may be drawn. First the transition time tends to converge and levels off as the system size gets larger, and particularly, it does not take many tuners to converge quickly. It seems beyond the size of 10,000 tuners, the transition time difference can be practically ignored. Preferably, the service manager sets the transition time during which a program is delivered in both the broadcasting and the switched broadcasting tiers to be between 10 to 15 minutes.

It should be noted that this exercise shows the average channel line-up update time, which essentially is the time it takes for all tuners tuning to broadcast channels to die that need to be moved to the switched tier. There are always outlying instances where some people might be watching the same TV channel for hours in the middle of the night. This phenomenon can be addressed by a hard switch (meaning a small blink of the TV screen when the channel is moved to another spectrum band) or a prompted message indicating a stream tear-down unless some action on the remote control. The application of a hard switch might take into consideration of the following factors: 1. The number of tuners that are still active in tuning into the program channel intended to be moved to the switch tier. The more tuners that are discovered in the polling process, the more prudence in applying the hard switch method. 2. The amount of time passed since the first polling begins. If it is discovered in the polling process that a tuner or a number of tuners have been watching an excessive amount of time, the hard switch method may be applied. 3. The amount of spectrum of the broadcast channels in need of moving to the switch tier that has already been vacated. The more spectrum that has already been vacated, the less urgency to apply the hard switch method on the remaining broadcast channels that need to be moved to the switch tier. In other words, the service manager will monitor the various parameters mentioned above, and make a determination as to whether to perform a hard switch.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims. For example, while the embodiments are illustrated by transmission of television programs, the techniques illustrated thereby are equally applicable to the transmission of such as movies and songs or still other types of audio programs, video programs or audiovisual programs.

What is claimed:

1. A method for delivering video programs to customers by means of a system that is capable of operating in two different modes, a broadcast mode and a switched mode, wherein video programs are delivered in the broadcast mode to customers irrespective of whether the video programs are requested by the customers, and delivered in the switched mode only to customers who requested the video programs, said method comprising:

delivering a plurality of video programs to customers in at least one of the broadcast and the switched modes; and for at least one of said plurality of video programs that is being delivered to at least a first customer in a first mode of the two modes, causing said at least one video program to be delivered for at least a second customer different from the first customer, in a second mode that is different from the first mode, wherein said at least one video program is delivered to said first and second customers simultaneously in the two different modes only during a transition time period of predetermined duration, after which delivery of said at least one video program in the first mode is terminated, and wherein said causing is transparent to said first customer during the transition time period.

2. The method of claim 1, wherein said transition time period is between 10 and 15 minutes.

3. The method of claim 1, wherein delivery of said at least one video program through the first mode is discontinued during the transition time period when it is determined that no customer is receiving said at least one video program through the first mode.

4. The method of claim 1, said system being a cable television system that comprises a headend, a plurality of hubs and a plurality of service groups of subscribers, each service group served by one of the plurality of hubs or the headend, said causing carried out on at least one of the service groups by the headend or one of the plurality of hubs that is serving said at least one service group.

5. The method of claim 1, said system being a cellular phone system that comprises a plurality of base stations, each base station in communication with a plurality of cellular phone users, said causing carried out on cellular phone users who are in communication with at least one of the base stations by said base station.

6. The method of claim 1, wherein said causing does not require a change in channel or frequency with respect to said first customer.

7. The method of claim 3, said first mode being the broadcast mode wherein said at least one video program through the first mode is delivered in a broadcast channel, further comprising shifting another program channel from a switched mode to a broadcast mode using said broadcast channel during the transition time period after said delivery of said at least one video program through the first mode is discontinued.

8. The method of claim 3, said first mode being the broadcast mode, said method further comprising polling customers during the transition time period to determine whether any customer is receiving said at least one video program through the broadcast mode.

9. The method of claim 8, said system being a cable television system that comprises a headend, a plurality of hubs and a plurality of service groups of subscribers, each service group served by one of the plurality of hubs or the headend, said polling carried out on at least one of the service groups by the headend or one of the plurality of hubs that is serving said at least one service group.

10. The method of claim 8, said system being a cellular phone system that comprises a plurality of base stations, each base station in communication with a plurality of cellular phone users, said polling carried out on cellular phone users who are in communication with at least one of the base stations by said base station.

11. A method for delivering video programs to customers by means of a system that is capable of operating in two different modes, a broadcast mode and a switched mode, wherein video programs are delivered in the broadcast mode to customers irrespective of whether the video programs are requested by the customers, and delivered in the switched mode only to customers who requested the video programs, wherein a video program is being delivered to at least one first customer in one of the two modes, said method comprising:

maintaining delivery of said video program to said at least one first customer in a first mode of the two modes monitoring requests for said video program; and when system capacity is available, delivering said video program in a second mode of the two modes different from the first mode to a second customer different from the first customer, when delivery of said video program in the first mode is maintained wherein said video program is delivered in the two different modes only during a transition time period of predetermined duration, after which delivery of said video program in the first mode is terminated.

12. The method of claim 11, wherein said transition time period is between 10 and 15 minutes.

13. The method of claim 11, said first mode being the broadcast mode, said method further comprising polling customers to determine whether any customer is receiving said video program through the broadcast mode.

14. The method of claim 11, said system being a cellular phone system that comprises a plurality of base stations, each base station in communication with a plurality of cellular phone users, said polling carried out on cellular phone users who are in communication with at least one of the base stations by said base station.

15. The method of claim 11, said system being a cable television system that comprises a headend, a plurality of hubs and a plurality of service groups of subscribers, each service group served by one of the plurality of hubs or the headend, said maintaining, monitoring and delivering carried out on at least one of the service groups by the headend or one of the plurality of hubs that is serving said at least one service group.

16. The method of claim 11, said system being a cellular phone system that comprises a plurality of base stations, each base station in communication with a plurality of cellular phone users, said maintaining, monitoring and delivering carried out on cellular phone users who are in communication with at least one of the base stations by said base station.

17. The method of claim 13, said system being a cable television system that comprises a headend, a plurality of hubs and a plurality of service groups of subscribers, each service group served by one of the plurality of hubs or the headend, said polling carried out on at least one of the service groups by the headend or one of the plurality of hubs that is serving said at least one service group.

18. A system that is capable of operating in two different modes, a broadcast mode and a switched mode, wherein video programs are delivered in the broadcast mode to customers irrespective of whether the video programs are requested by the customers, and delivered in the switched mode only to customers who requested the video programs, said system comprising a service manager that delivers a plurality of video programs to customers in at least one of the broadcast and the switched modes; and for at least one of said plurality of video programs that is being delivered to at least a first customer in a first mode of the two modes, causes said at least one video program to be delivered for at least a second customer different from the first customer, in a second mode that is different from the first mode, wherein said at least one video program is delivered in the two different modes only during a transition time period of predetermined duration, after which delivery of said at least one video program in the first mode is terminated.

19. A system that is capable of operating in two different modes, a broadcast mode and a switched mode, wherein video programs are delivered in the broadcast mode to customers irrespective of whether the video programs are requested by the customers, and delivered in the switched mode only to customers who requested the video programs, said system comprising a service manager that maintains delivery of a video program of said video programs to said at least one first customer in a first mode of the two modes; monitors requests for said video program; and when system capacity is available, delivers said video program in a second mode of the two modes different from the first mode to a second customer different from the first customer, when delivery of said video program in the first mode is maintained, wherein said video program is delivered in the two different modes only during a transition time period of predetermined duration, after which delivery of said video program in the first mode is terminated.

20. A method for delivering video programs to customers by means of a system that is capable of operating in two different modes, a broadcast mode and a switched mode, wherein video programs are delivered in the broadcast mode to customers irrespective of whether the video programs are requested by the customers, and delivered in the switched mode only to customers who requested the video programs, wherein a video program is being delivered to at least one first customer in the broadcast mode, said method comprising:
   maintaining delivery of said video program to said at least one first customer in the broadcast mode;
   monitoring requests for said video program;
   when system capacity is available, delivering said video program in the switched mode to a second customer different from the first customer, when delivery of said video program in the broadcast mode is maintained, wherein said video program is delivered in the two different modes only during a transition time period of predetermined duration, after which delivery of said video program in the broadcast mode is terminated.

21. The method of claim 20, further comprising determining whether any customer is receiving said video program in the broadcast mode and terminating the delivery of said video program in the broadcast mode depending on whether customers are tuned in to said video program in the broadcast mode.

22. The method of claim 21, wherein said determining includes polling customers to determine whether any customer is receiving said video program through the broadcast mode.

23. The method of claim 22, wherein the transition period is between 10 and 15 minutes.

24. A method for delivering video programs to customers by means of a system that is capable of operating in two different modes, a broadcast mode and a switched mode, wherein video programs are delivered in the broadcast mode in broadcast channels to customers irrespective of whether the video programs are requested by the customers, and delivered in the switched mode only to customers who requested the video programs in switched channels, wherein video programs are being delivered to customers in one of the two modes, said method comprising:
   maintaining delivery of the video programs to said customers in one of the two modes;
   monitoring requests for said video programs; and
   when system capacity is available, choosing to start delivery of a video program of said video programs already being delivered in a first mode of the two modes in a second mode of the two modes different from the first mode, wherein delivery of said video program in the two different modes occurs only during a transition time period of predetermined duration, after which delivery of said video program in the first mode is terminated, in order to switch the delivery of said video program from the first to the second mode, and wherein said choosing chooses starting delivery of a video program that is being delivered in the broadcast mode over starting delivery of a video program that is being delivered in the switched mode.

* * * * *